United States Patent
Zayas et al.

(10) Patent No.: US 9,747,043 B2
(45) Date of Patent: Aug. 29, 2017

(54) WRITE REORDERING IN A HYBRID DISK DRIVE

(71) Applicant: KABUSHIKI KAISHA TOSHIBA, Tokyo (JP)

(72) Inventors: Fernando Anibal Zayas, Rangiora (NZ); Richard M. Ehrlich, Saratoga, CA (US); Eric R. Dunn, Cupertino, CA (US)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/956,280

(22) Filed: Dec. 1, 2015

(65) Prior Publication Data

US 2016/0085457 A1 Mar. 24, 2016

Related U.S. Application Data

(62) Division of application No. 13/423,083, filed on Mar. 16, 2012, now abandoned.

(51) Int. Cl.
*G06F 12/02* (2006.01)
*G06F 3/06* (2006.01)
(Continued)

(52) U.S. Cl.
CPC ............ *G06F 3/0611* (2013.01); *G06F 3/064* (2013.01); *G06F 3/068* (2013.01); *G06F 3/0647* (2013.01); *G06F 12/0868* (2013.01); *G11B 5/012* (2013.01); *G11B 20/10* (2013.01); *G11B 20/12* (2013.01); *G06F 12/0804* (2013.01); *G06F 2212/1024* (2013.01); *G06F 2212/217* (2013.01); *G06F 2212/222* (2013.01); *G06F 2212/253* (2013.01); *G06F 2212/281* (2013.01);
(Continued)

(58) Field of Classification Search
CPC ....... G06F 2212/2022; G06F 2212/222; G06F 3/064; G06F 3/0611; G06F 12/0868; G06F 12/10; G06F 2212/1024
USPC .......................................................... 711/103
See application file for complete search history.

(56) References Cited

U.S. PATENT DOCUMENTS 7,010,653 B2   3/2006   Uchida et al.
7,031,092 B2   4/2006   Tanaka et al.
(Continued)

FOREIGN PATENT DOCUMENTS

JP   2008-034069 A   2/2008
JP   2010-512568 A   4/2010
JP   2011-238114 A   11/2011

OTHER PUBLICATIONS

Japanese Office Action dated Apr. 19, 2016 in counterpart Japanese Patent Application Serial No. 2012-163029.

*Primary Examiner* — Jasmine Song
(74) *Attorney, Agent, or Firm* — Patterson & Sheridan, LLP

(57) ABSTRACT

A hybrid drive and associated methods increase the rate at which data are transferred to a nonvolatile storage medium in the hybrid drive. By using a large nonvolatile solid state memory device as cache memory for a magnetic disk drive, a very large number of write commands can be cached and subsequently reordered and executed in an efficient manner. In addition, strategic selection and reordering of only a portion of the write commands stored in the nonvolatile solid state memory device increases efficiency of the reordering process.

27 Claims, 12 Drawing Sheets

(51) Int. Cl.
*G11B 5/012* (2006.01)
*G11B 20/10* (2006.01)
*G11B 20/12* (2006.01)
*G06F 12/0868* (2016.01)
*G06F 12/0804* (2016.01)

(52) U.S. Cl.
CPC .. *G06F 2212/305* (2013.01); *G06F 2212/313* (2013.01); *G06F 2212/461* (2013.01); *G06F 2212/69* (2013.01); *G06F 2212/70* (2013.01); *G11B 2020/1294* (2013.01); *G11B 2220/45* (2013.01)

(56) References Cited

U.S. PATENT DOCUMENTS

| | | |
|---|---|---|
| 7,457,077 B2 | 11/2008 | Lee |
| 7,644,206 B2 | 1/2010 | Lawson et al. |
| 8,102,614 B2 | 1/2012 | Song et al. |
| 8,438,334 B2 * | 5/2013 | Bell, Jr. ............... G06F 3/0611 711/103 |
| 9,134,917 B2 * | 9/2015 | Kimmel |
| 2005/0188151 A1 | 8/2005 | Lee |
| 2007/0130442 A1 | 6/2007 | Lee et al. |
| 2009/0292865 A1 | 11/2009 | Hong |
| 2010/0011168 A1 | 1/2010 | Ryu et al. |
| 2010/0070689 A1 | 3/2010 | Lee et al. |
| 2010/0070699 A1 | 3/2010 | Lee et al. |

\* cited by examiner

WRITE REORDERING IN A HYBRID DISK DRIVE

CROSS-REFERENCE TO RELATED APPLICATION

This application is divisional of U.S. patent application Ser. No. 13/423,083, filed Mar. 16, 2012, the entire contents of which are incorporated herein by reference.

BACKGROUND

Field of the Invention

Embodiments of the present invention relate generally to disk drives and, more particularly, to systems and methods of write reordering in a hybrid disk drive.

Description of the Related Art

A hard disk drive (HDD) is a commonly used data storage device for the computer and primarily stores digital data in concentric tracks on the surface of a data storage disk. The data storage disk is a rotatable hard disk with a layer of magnetic material thereon, and data are read from or written to a desired track on the data storage disk using a read/write head that is held proximate to the track while the disk spins about its center at a constant angular velocity. Data are written to the data storage disk in accordance with a write command transferred to the HDD from a host computer.

Generally, write commands can be received by an HDD much more quickly than the data associated with each command can be written to the data storage disk. Consequently, an HDD typically stores data received from the host computer temporarily in a volatile buffer, such as a DRAM chip, prior to actually executing the write command, and uses a command queue to track each write command received from the host computer. To maximize the speed at which data residing in the volatile buffer are safely written to the data storage disk, the command queue is typically reordered, so that write commands transferred from the host system are not executed in the order received. Instead, write commands are selected as a function of how quickly they can be executed by the HDD based on the current position of the read/write head, the write location specified by each write command, the rotational speed of the data storage disk, the maximum seek acceleration of the HDD, the servo-settle time of the HDD, etc.

Various approaches for re-ordering the command queue in a hard disk drive are known, and in general the efficiency of such reordering schemes is enhanced by reordering larger numbers of writes. For example, when writing 4 kilobyte (kB) random writes, an HDD having a random-write performance of 70 input/output operations per second (IOPS) with no reordering of write commands, and approximately 200 IOPS when reordering 64 write commands, can potentially execute as many as 400 IOPS when using a reordering algorithm that reorders 1500 write commands. However, the time available for an HDD to select the next write command to be executed in the command queue is limited; during the time that the current write command is being executed, the queue of remaining commands must be reordered and the write command having the shortest access time determined. Because the time to reorder long command queues is generally longer than the time required to execute a typical write command, the use of such long command queues, e.g., command queues having 200 or more write commands, is generally impracticable. Consequently, improvements in random write performance of HDDs are generally limited to incremental enhancements in the mechanical performance of HDD servo systems and storage disk rotation speed. In light of the above, systems and methods that improve write reordering and/or increase the rate at which data are transferred to a non-volatile medium in an HDD are generally desirable.

SUMMARY

One or more embodiments of the present invention provide systems and methods for increasing the rate at which data are transferred to a non-volatile medium in an HDD.

According to one embodiment of the present invention, a method of storing data in a hybrid drive having a control unit programmed to control storing of data into a nonvolatile solid state memory device and a magnetic storage disk, includes the control unit performing the steps of receiving data to be stored, and writing the received data directly in the nonvolatile solid state memory device without storing the received data in a DRAM buffer associated with the magnetic storage disk.

In a data storage device having a nonvolatile solid state memory device, a magnetic storage disk, and a control unit, a method of ordering data blocks to be written to the magnetic storage disk, according to another embodiment of the present invention, includes the steps of writing the data blocks to the nonvolatile solid state memory device, selecting N data blocks out of M data blocks stored in the nonvolatile solid state memory device, where N is less than M, ordering the selected data blocks prior to writing the selected data blocks to the magnetic storage disk, and writing the first of the ordered data blocks to the magnetic storage disk, wherein selecting N data blocks comprises selecting the N oldest data blocks from a least-recently-used list of data blocks that are stored in the nonvolatile solid state memory device and have not been written to the magnetic storage disk.

In a data storage device having a nonvolatile solid state memory device, a magnetic storage disk, and a control unit, a method of ordering data blocks to be written to the magnetic storage disk, according to another embodiment of the present invention, includes the steps of writing the data blocks to the nonvolatile solid state memory device, selecting N data blocks out of M data blocks stored in the nonvolatile solid state memory device, where N is less than M, ordering the selected data blocks prior to writing the selected data blocks to the magnetic storage disk, writing the first of the ordered data blocks to the magnetic storage disk, and periodically writing the oldest data block stored in the nonvolatile solid state memory device from a least-recently-used list of data blocks that are stored in the nonvolatile solid state memory device and have not been written to the magnetic storage disk, wherein selecting N data blocks comprises selecting N data blocks whose logical block addresses correspond to the N closest locations on the magnetic storage disk to the current location of an active read-write head of the magnetic storage disk.

In a data storage device having a nonvolatile solid state memory device, a magnetic storage disk, and a control unit, a method of ordering data blocks to be written to the magnetic storage disk, according to another embodiment of the present invention, includes the steps of writing the data blocks to the nonvolatile solid state memory device, selecting data blocks stored in the nonvolatile solid state memory device whose logical block addresses correspond to locations disposed in a subzone region of the magnetic storage disk in which an active read-write head of the magnetic storage disk is located, ordering the selected data blocks prior to writing the selected data blocks to the magnetic storage disk, and writing the first of the ordered data blocks to the magnetic storage disk.

BRIEF DESCRIPTION OF THE DRAWINGS

So that the manner in which the above recited features of embodiments of the invention can be understood in detail, a more particular description of embodiments of the invention, briefly summarized above, may be had by reference to the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
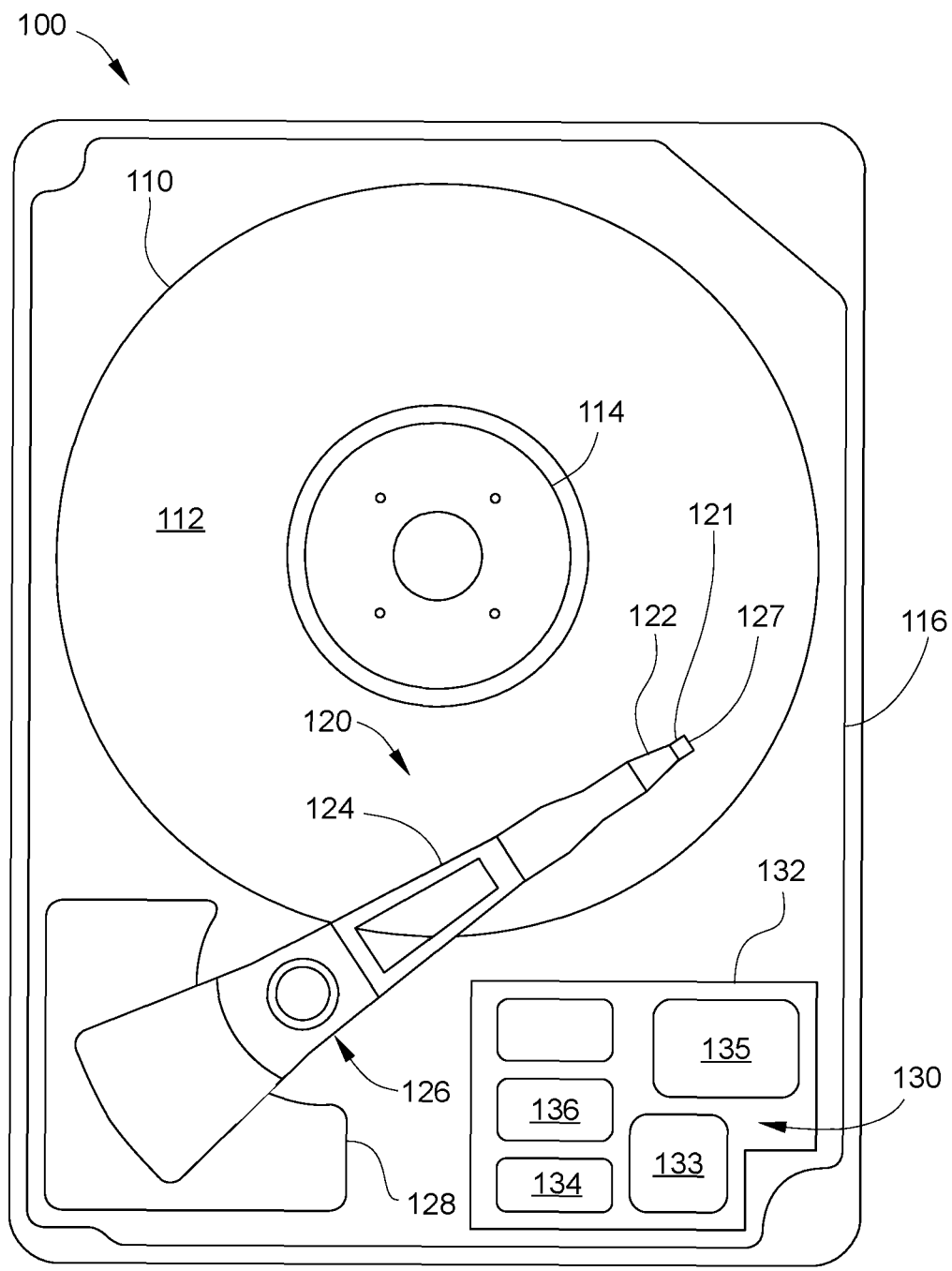
FIG. 1 is a schematic view of an exemplary disk drive, according to an embodiment of the invention.

FIG. 1 is a schematic view of an exemplary disk drive, according to an embodiment of the invention. For clarity, disk drive 100 is illustrated without a top cover. Disk drive 100 includes at least one storage disk 110 that is rotated by a spindle motor 114. Spindle motor 114 is mounted on a base plate 116. An actuator arm assembly 120 is also mounted on base plate 116, and has a slider 121 mounted on a flexure arm 122 with a read/write head 127. Flexure arm 122 is attached to an actuator arm 124 that rotates about a bearing assembly 126. Voice coil motor 128 moves slider 121 relative to storage disk 110, thereby positioning read/write head 127 over the desired concentric data storage track disposed on the surface 112 of storage disk 110. Spindle motor 114, read/write head 127, and voice coil motor 128 are coupled to electronic circuits 130, which are mounted on a printed circuit board 132. The electronic circuits 130 include a read channel, a microprocessor-based controller 133, random-access memory (RAM) 134 (which may be a dynamic RAM), and/or a flash memory device 135 and flash manager device 136. For clarity, disk drive 100 is illustrated with a single storage disk 110 and a single actuator arm assembly 120. Disk drive 100 may also include multiple storage disks and multiple actuator arm assemblies. In addition, each side of storage disk 110 may have an associated read/write head coupled to a flexure arm.

In some embodiments, disk drive 100 is configured as a hybrid drive, and in normal operation data can be stored to and retrieved from storage disk 110 and/or flash memory device 135. In a hybrid drive, non-volatile memory, such as flash memory device 135, supplements the spinning HDD to provide faster boot, hibernate, resume and other data read-write operations, as well as lower power consumption. Such a hybrid drive configuration is particularly advantageous for battery operated computer systems, such as mobile computers or other mobile computing devices. In a preferred embodiment, flash memory device is a non-volatile solid state storage medium, such as a NAND flash chip that can be electrically erased and reprogrammed, and is sized to supplement storage disk 110 in disk drive 100 as a non-volatile storage medium. For example, in some embodiments, flash memory device 135 has data storage capacity that is orders of magnitude larger than RAM 134, e.g., gigabytes (GB) vs. megabytes (MB).

Figure 2:
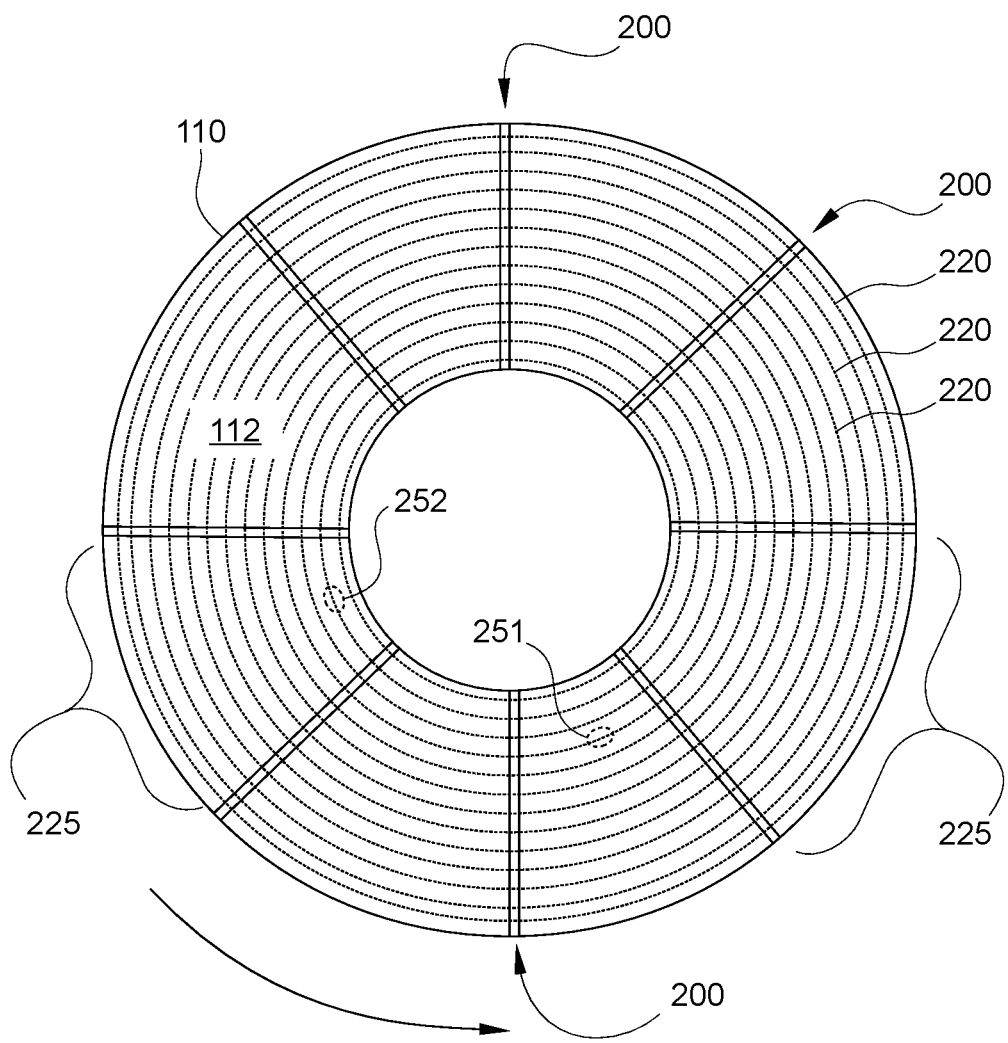
FIG. 2 illustrates a storage disk with data organized after servo wedges have been written on the storage disk.

FIG. 2 illustrates storage disk 110 with data organized after servo wedges 200 have been written on storage disk 110. Servo wedges 200 may be written on storage disk 110 by either a media writer or by disk drive 100 itself via a self servo-write (SSW) process. Servo wedges 200 are substantially radially aligned and are shown crossing data storage tracks 220. Servo wedges 200 contain servo information that defines the radial position and track pitch, i.e., spacing, of data storage tracks 220. In practice, servo wedges 200 may be somewhat curved, for example, servo wedges 200 may be configured in a spiral pattern that mirrors the path that would be followed by read/write head 127 if it were to move across the stroke while storage disk 110 is not spinning. Such a spiral pattern advantageously results in the wedge-to-wedge timing being independent of the radial position of read/write head 127. For simplicity, servo wedges 200 are depicted as substantially straight lines in FIG. 2.

Storage disk 110 also includes concentric data storage tracks 220 located in data regions 225 for storing data. Data storage tracks 220 are positionally defined by the servo information written in servo wedges 200. Typically, the actual number of data storage tracks 220 and servo wedges 200 included on storage disk 110 is considerably larger than illustrated in FIG. 1. For example, storage disk 110 may include hundreds of thousands of concentric data storage tracks 220 and hundreds of servo wedges 200. Data stored on data storage tracks 220 are referenced by a host computer in terms of logical block addresses (LBAs) that are mapped by disk drive 100 to a specific physical location, so that each LBA of disk drive 100 corresponds to a specific cylinder-head-sector location. In embodiments in which disk drive 100 includes flash memory device 135, LBAs of data sent to disk drive 100 are also associated with a flash logical block address (FLB) when temporarily written to flash memory device 135.

When data are transferred to or from storage disk 110, actuator arm assembly 120 sweeps an arc between an inner diameter (ID) and an outer diameter (OD) of storage disk 110. Actuator arm assembly 120 accelerates in one angular direction when current is passed through the voice coil of voice coil motor 128 and accelerates in an opposite direction when the current is reversed, thereby allowing control of the position of actuator arm assembly 120 and attached read/write head 127 with respect to storage disk 110. Voice coil motor 128 is coupled with a servo system known in the art that uses the positioning data read from servo wedges 200 by read/write head 127 to determine the position of read/write head 127 over a specific data storage track 220. The servo system determines an appropriate current to drive through the voice coil of voice coil motor 128, and drives said current using a current driver and associated circuitry.

After executing a write command having an LBA corresponding to a first position 251 on storage disk 110, an access time occurs before disk drive 100 can execute a second write command having an LBA corresponding to a second position 252 on storage disk 110. Specifically, during the access time, read/write head 127 is moved to the target data track and the servo system stabilizes the position of read/write head 127 prior to passing over the target sector, i.e., second position 252. Thus, the total access time includes the seek time for radially positioning read/write head 127 to the target data track and the rotational latency for circumferentially positioning read/write head 127 over the target sector. Reordering of write commands in a command queue is based on the calculated access time for each write command in the command queue.

According to some embodiments of the invention, disk drive 100 is configured as a hybrid drive in which data received from a host computer are written directly to flash memory device 135 for subsequent writing to storage disk 110. Essentially, flash memory device 135 can be used as a very large, non-volatile buffer for storage disk 110. In such embodiments, the rate at which data are transferred from the host computer to a non-volatile medium in disk drive 100 is substantially increased, since as soon as data are received by disk drive 100, the data can be considered "safe," i.e., retrievable even after a power loss event.

Figure 3A:
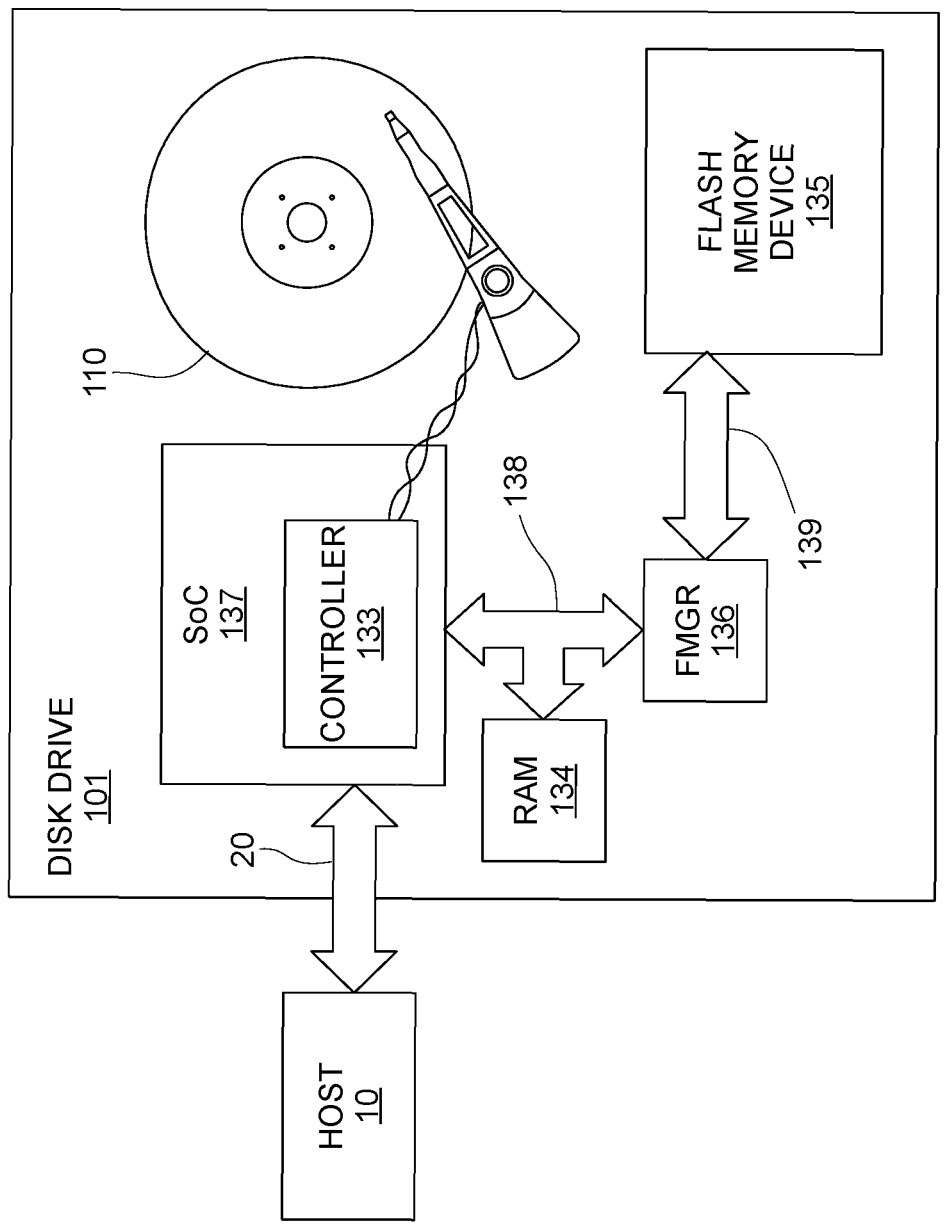
FIG. 3A illustrates an operational diagram of a disk drive with a flash memory device configured as a cache memory for the disk drive, according to an embodiment of the invention.

FIG. 3A illustrates an operational diagram of disk drive 100 with flash memory device 135 configured as a cache memory for disk drive 100, according to an embodiment of the invention. As shown, disk drive 100 includes RAM 134, flash memory device 135, a flash manager device 136, a system-on-chip 137, and a high-speed data path 138. Disk drive 100 is connected to a host 10, such as a host computer, via a host interface 20, such as a serial advanced technology attachment (SATA) bus.

Flash manager device 136 controls interfacing of flash memory device 135 with high-speed data path 138 and is connected to flash memory device 135 via a NAND interface bus 139. System-on-chip 137 includes microprocessor-based controller 133 and other hardware for controlling operation of disk drive 100, and is connected to RAM 134 and flash manager device 136 via high-speed data path 138. Microprocessor-based controller 133 is a control unit that may be a microcontroller such as an ARM microprocessor, a hybrid drive controller, or any control circuitry within disk drive 100. High-speed data path 138 is a high-speed bus known in the art, such as a double data rate (DDR) bus, a DDR2 bus, a DDR3 bus, and the like.

Figure 3B:
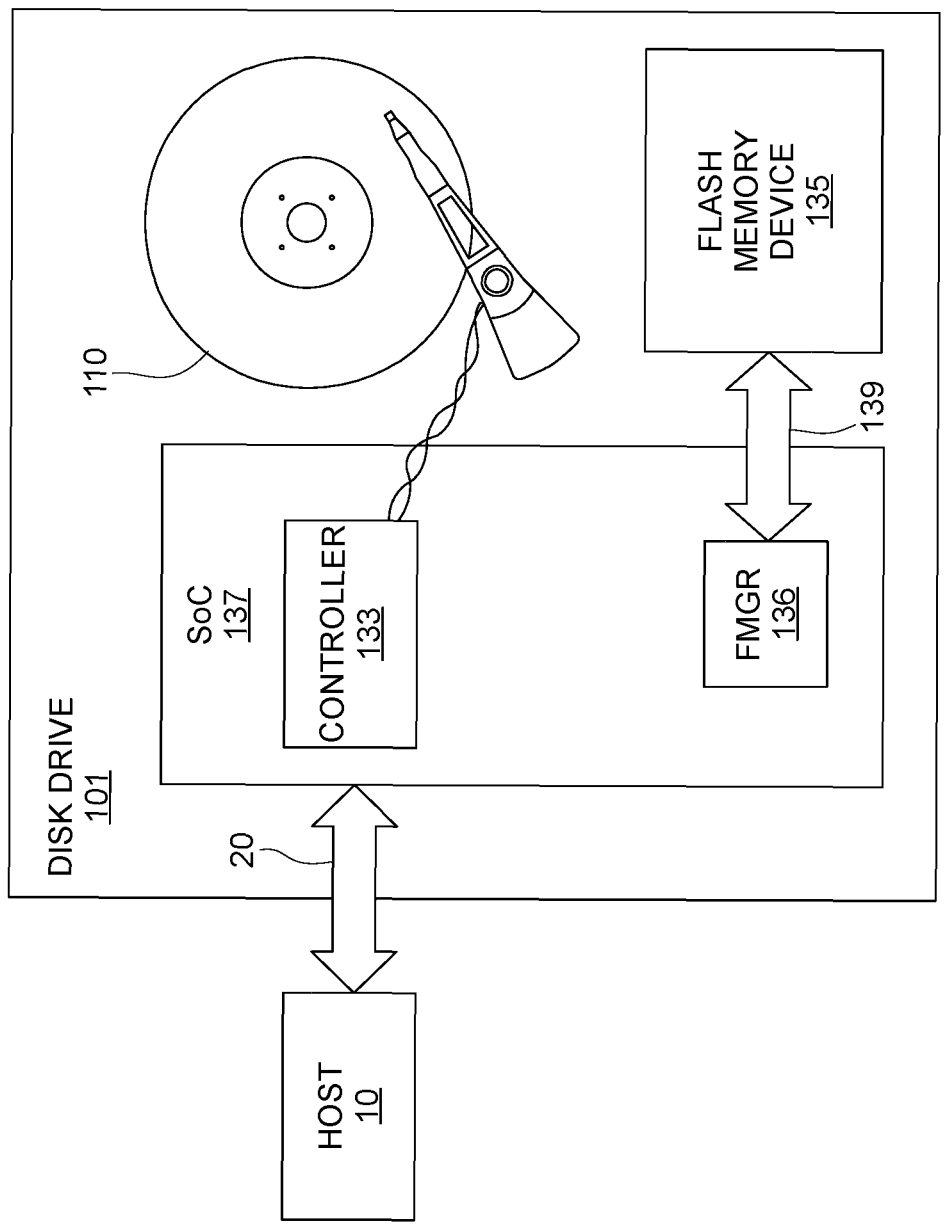
FIG. 3B illustrates an operational diagram of a disk drive with a flash memory device configured as a cache memory for the disk drive, according to another embodiment of the invention.

FIG. 3B illustrates an operational diagram of disk drive 100 with flash memory device 135 configured as a write-back cache for disk drive 100, according to another embodiment of the invention. As shown, flash manager device 136 is incorporated into system-on-chip 137, and is connected to flash memory device 135 via NAND interface bus 139.

In operation, microprocessor-based controller 133 of disk drive 100 receives write commands from host 10 via host interface 20. Each write command received by microprocessor-based controller 133 includes one or more data blocks and LBAs associated with each data block. The term "write command," as used herein, generally includes a data block and associated metadata, such as LBA, etc. Microprocessor-based controller 133 then stores the received write commands directly in flash memory device 135 without storing the received data in RAM 134. In the embodiment illustrated in FIG. 3A, the received write commands and associated metadata are directed to flash manager device 136 via high-speed data path 138, and flash manager device 136 passes the received write commands and associated metadata to flash memory device 135. In the embodiment illustrated in FIG. 3B, the write commands and associated metadata received from host 10 are directed to flash manager device 136 in system-on-chip 137, and flash manager device 136 passes the received write commands and associated metadata to flash memory device 135 via NAND interface bus 139.

Figure 3C:
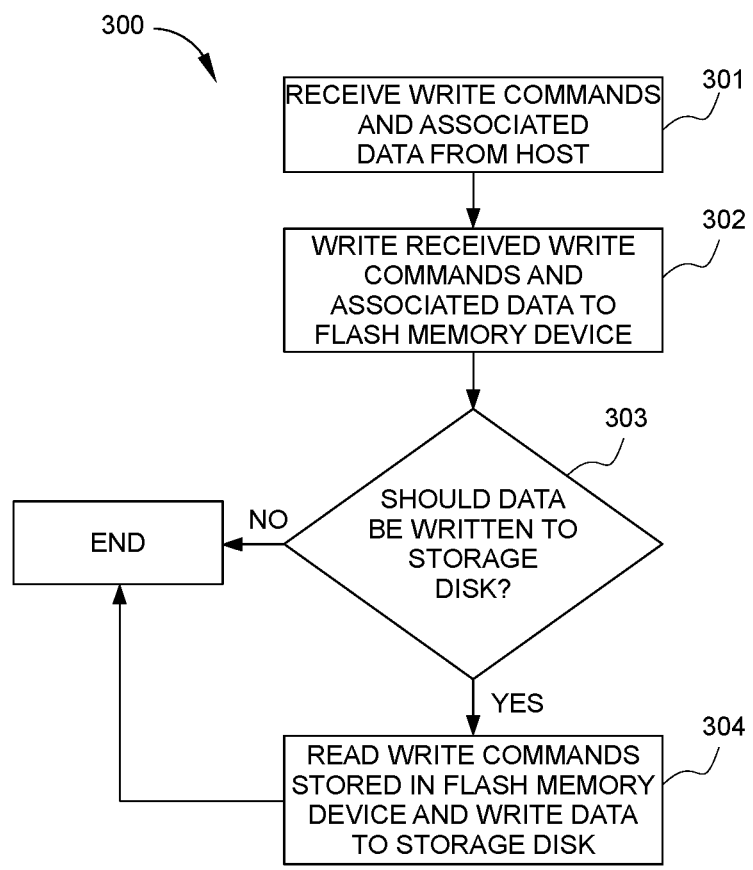
FIG. 3C sets forth a flowchart of method steps for storing data in a hybrid drive, according to embodiments of the invention.

FIG. 3C sets forth a flowchart of method steps for storing data in a hybrid drive, according to embodiments of the invention. Although the method steps are described in conjunction with disk drive 100 in FIGS. 1, 2, 3A and 3B, persons skilled in the art will understand that method 300 may be performed with other types of systems. For example, embodiments may of method 300 may be applied to a solid-state storage drive with a relatively large non-volatile storage element, such as an FeRAM, that is used as a non-volatile cache for the solid-state storage drive.

As shown, method 300 begins at step 301, when microprocessor-based controller 133 receives data to be stored from host 10, e.g., write commands for data to be stored on storage disk 110.

In step 302, microprocessor-based controller 133 stores the write commands directly in flash memory device 135 without storing the write commands in RAM 134. In some embodiments, both the data and metadata associated with the write commands received in step 301 are written directly to flash memory device 135. In other embodiments, the data associated with said write commands is written directly to flash memory device 135 and the corresponding metadata may be temporarily stored in RAM 134 and periodically written to flash memory device 135 when convenient.

In step 303, microprocessor-based controller 133 determines whether or not data stored in flash memory device 135 should be written to storage disk 110. When the determination is made that data stored in flash memory device 135 should be written to storage disk 110, method 300 proceeds to step 304. In some embodiments, data stored in flash memory device 135 should be written to storage disk 110 when read/write head 127 is determined to be idle and not reading data from or writing data to storage disk 110. In other embodiments, data stored in flash memory device 135 should be written to storage disk 110 whenever the storage capacity of flash memory device 135 is determined to be depleted. In some embodiments, the storage capacity of flash memory device 135 is determined to be depleted when substantially no storage capacity is available for storing additional data received from host 10. In other embodiments, the storage capacity of flash memory device 135 is determined to be depleted when flash memory device 135 has less than a predetermined quantity of storage capacity available for storing additional data.

In step 304, microprocessor-based controller 133 reads the write commands stored in flash memory device 135 and executes said write commands to storage disk 110. Different methods of selecting which write commands are executed and in what order are described below in conjunction with FIGS. 5-10.

Thus, method 300 maximizes the data transfer rate from host 10 to disk drive 100 since write commands are stored directly to flash memory device 135 and are only executed to storage disk 110 when read/write head 127 would otherwise be idle. In addition, because flash memory device 135 is a nonvolatile memory storage device, write commands received by disk drive 100 from host 10 can be considered safe from loss due to power loss almost immediately; it is not necessary to wait until the received write commands have been executed to storage disk 110.

While the disk drive architecture illustrated in FIGS. 3A, 3B enables the use of flash memory device 135 as a cache memory, reordering the very large number of write commands that can be stored in flash memory device 135 using reordering schemes known in the art is not practical. For example, when flash memory device 135 has a storage capacity of 16 GB, the number of 4 kB random writes flash memory device 135 can cache is on the order of 4 million. The time required to reorder just a few hundred write commands using simple reordering algorithms generally exceeds the time available to complete such a calculation, i.e., such a reordering calculation requires longer than the typical access time for a write command. Thus, using reordering schemes known in the art on the large number of write commands that can be stored in flash memory device 135 likely will not result in an increase in the data transfer rate from flash memory device 135 to storage disk 110.

In addition, once flash memory device 135 is filled with data from a host computer, data transfer from the host computer to disk drive 100 is restricted to the rate at which data can be written to storage disk 110 from flash memory device 135. This is because data cannot be transferred from the host to computer to flash memory device 135 until storage space has been made available in flash memory device 135 by flushing data to storage disk 110 and "evicting" data from flash memory device 135. Consequently, the more efficiently data are transferred from flash memory device 135 to storage disk 110, the more quickly additional data can be received by disk drive 100 from the host computer and the less total power is consumed by drive 100. Furthermore, when flash memory device 135 is used as cache memory for storage disk 110, the large number of write commands received from the host computer and stored in flash memory device 135 can lead to some write commands remaining for undesirably long periods in flash memory device 135 without being written to storage disk 110. Although data received from the host computer and stored in flash memory device 135 are considered safe, failure to write such data to storage disk 110 for extended periods of time is generally undesirable.

In some embodiments, an eviction scheme is used in conjunction with a write-reordering algorithm to improve the performance of disk drive 100. Such embodiments minimize how long data remains in flash memory device 135 without being written to storage disk 110 by ensuring that the least-recently-used data stored in flash memory device 135 are periodically evicted. In addition, such embodiments provide a computationally efficient method for selecting write commands to be executed to storage disk 110; specifically, a manageable number of write commands stored in flash memory device 135 are selected for reordering based on criteria disclosed herein.

Figure 4:
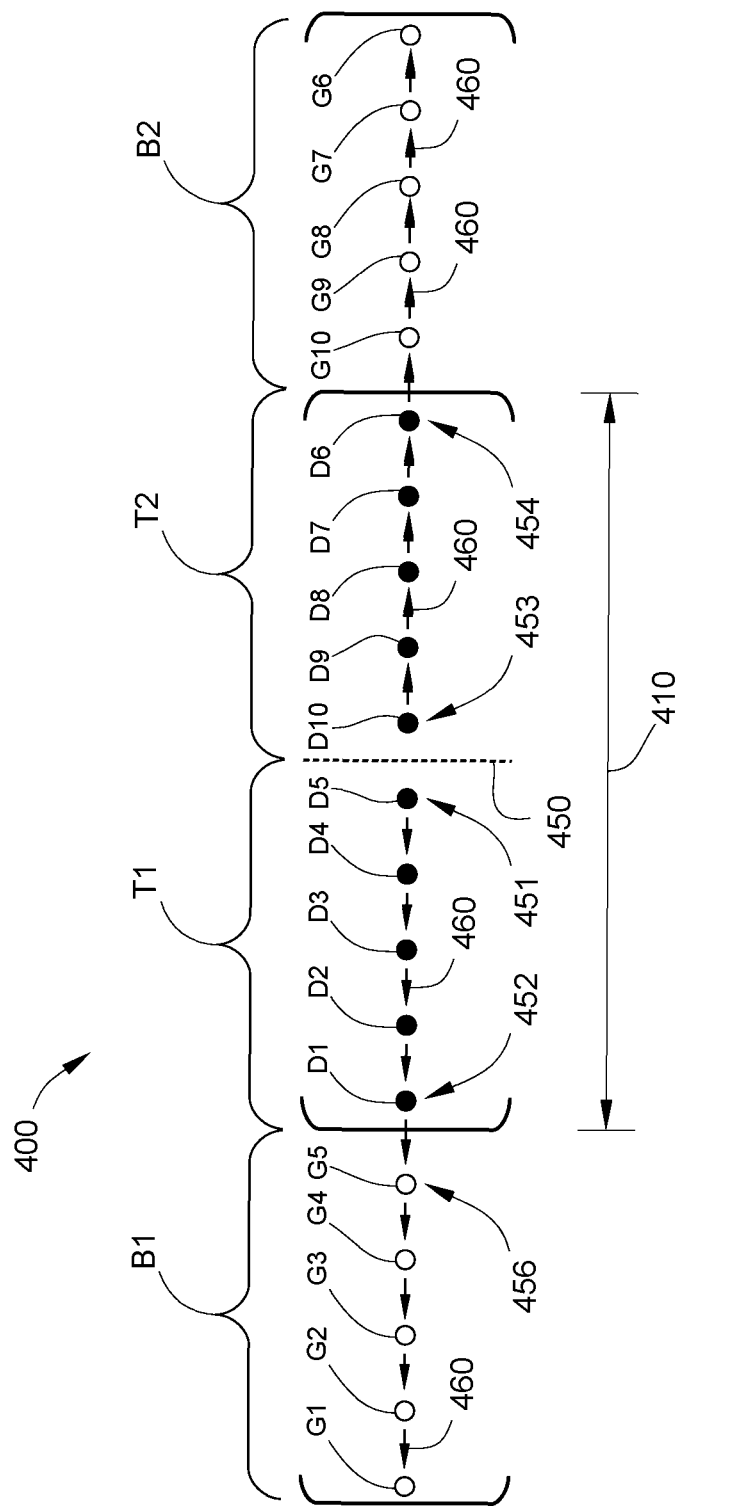
FIG. 4 illustrates a diagram of a cache directory used in embodiments of the invention.

FIG. 4 illustrates a diagram of a cache directory 400 used in embodiments of the invention. Cache directory 400 represent a page replacement algorithm known in the art as an adaptive replacement cache (ARC) scheme, which tracks both recency and frequency of cache entries D1-D10 in flash memory device 135. To that end, cache directory 400 splits a standard cache directory of all cache entries in flash memory device 135 into a recency list T1 and a frequency list T2 as shown. Cache directory 400 further includes a ghost recency list B1 and a ghost frequency list B2 that are ghost entry lists linked to recency list T1 and frequency list T2, respectively.

Together, recency list T1 and frequency list T2 include all cache entries currently held in cache directory 400, as indicated by fixed cache size 410. Thus, the data corresponding to cache entries D1-D5 of recency list T1 and the cache entries D6-D10 of frequency list T2 include all data currently being stored in flash memory device 135. For clarity, only five cache entries are illustrated in recency list T1 and five in frequency list T2, but in practice the total number of cache entries can be very large, e.g. on the order of thousands or millions. Furthermore, recency list T1 and frequency list T2 are depicted as having equal size in FIG. 4. In practice, recency list T1 and frequency list T2 can each include a different-sized portion of the total cache entries D1-D10 in cache directory 400. In some embodiments, the relative sizes of recency list T1 and frequency list T2 can vary during normal operation of disk drive 100 based on cache hits associated with ghost recency list B1 and a ghost frequency list B2.

Recency list T1, frequency list T2, ghost recency list B1, and ghost frequency list B2 are all least-recently used (LRU), linked lists configured to track properties of each block of data stored in flash memory device 135. As such, entries are placed at the top of each list, and existing entries in each list are moved down the list when such an entry is made, eventually reaching the bottom of the list after a large number of cache entries have been made to cache directory 400. Thus, when fully populated, any entry to one of these lists results in the eviction of whatever cache entry is located at the bottom of that list. The top of recency list T1 is located at an entry position 451, which is adjacent to a divider 450, and the bottom of recency list T1 is located at an entry position 452, which is adjacent to ghost recency list B1. Similarly, the top of frequency list T2 is located at an entry position 453, which is adjacent to divider 450, and the bottom of frequency list T2 is located at an entry position 454, which is adjacent to ghost frequency list B2. As indicated by arrows 460, new cache entries to recency list T1, which occur at entry position 451, push existing cache entries toward ghost recency list B1, and new cache entries to frequency list T2, which occur at entry position 453, push existing cache entries toward ghost frequency list B2.

Each of cache entries D1-D10 is a data structure associated with a specific block of data, e.g., 4 kB, 32 kB, etc., that has been received from a host computer by disk drive 100 and is stored in flash memory device 135. In embodiments of the invention, said data structures may correspond to the data block associated with a specific write command received by microprocessor-based controller 133 from host 10. Cache entries D1-D10 each include an LBA associated with a specific data block, a flash logical block address associated with the data bock, and a "dirty" flag for the data block that indicates if that block of data has already been written to storage disk 100. "Dirty" blocks are data blocks that have not yet been written to storage disk 110 and therefore only reside in flash memory device 135. "Non-Dirty" blocks are data blocks that either were written to the flash memory device and then subsequently written to the disk, or data blocks that were read from the disk (in response to a host request for data that was not already in the flash memory device), and then subsequently copied to the flash memory device. Ghost entries G1-G5 in ghost recency list B1 are metadata entries representing cache entries recently evicted from recency list T1, and ghost entries G6-G10 in ghost frequency list B2 are metadata entries representing cache entries recently evicted from frequency list T2. It is noted that a cache entry from recency list T1 or frequency list T2 is generally only converted to a ghost entry, i.e., evicted from flash memory device 135, if an identical copy of the data associated with the cache entry already exists on the storage disk 110. In some embodiments, a cache entry may be converted to a ghost entry without being written to disk if the data associated with said cache entry corresponds to data designated by host 10 as no longer needed via a TRIM command.

In operation, a cache entry is made to recency list T1 at entry position 451 whenever a block of data is received by disk drive 100 from the host computer and is stored in flash memory device 135. Any existing cache entries in recency list T1 are pushed toward ghost recency list B1, and the cache entry currently in entry position 452 is flushed, i.e., written to storage disk 110, and then evicted, i.e., the metadata for the flushed cache entry is made as an entry to ghost recency list B1 at entry position 456. Whenever the host computer asks to write a data block corresponding to any cache entry from any of the LRU lists making up cache directory 400, i.e., any of cache entries D1-D10 or ghost entries G1-G10, the cache entry of interest is moved to the top of frequency list T2 at entry position 453. Accordingly, all other entries in frequency list T2 are pushed toward ghost frequency list B2.

In some embodiments, the page replacement algorithm illustrated in FIG. 4 is modified to reduce the total "bookkeeping" operations associated with the use of double-linked LRU lists T1, T2, B1, and B2. Specifically, each of LRU lists T1, T2, B1, and B2 are linked lists that include a data structure for each data block, i.e., data associated with each write command received from host 10, included in the linked list. Such data structures carry a significant record-keeping and memory allocation burden when the size of such LRU lists has hundreds of thousands of entries. For example, because each data structure includes a pointer referencing the next less-recently-used data block in the linked list and a pointer referencing the next more-recently-used data block in the linked list, whenever a write command is evicted from the linked list, several operations take place updating the pointers in adjacent entries in order to maintain the integrity of the linked list.

In some embodiments of the invention, LRU lists T1, T2, B1, and B2 are lists of write command groups, rather than lists of individual write commands. In such an embodiment, write commands stored in flash memory device 135 are collected in such write command groups, where write commands of a similar recency are included in the same write command group. Each write command group includes a pointer referencing the next less-recently-used data block group in the linked list and a pointer referencing the next more-recently-used data block group in the linked list, but each write command in a write command group does not require pointers to (temporally) adjacent write commands. Thus, when a write command is removed from an LRU list and/or moved to another LRU list, pointers of adjacent write commands are not updated. In such embodiments, the cache entries D1-D10 and ghost entries G1-G10 represent write command groups, rather than individual write commands. Once a write command group has less than a minimum predetermined number of write commands, the write command group can be merged with an adjacent write command group, and pointers referencing the next less-recently-used data block group in the linked list and a pointer referencing a next more-recently-used data block group in the linked list are updated accordingly.

It is noted that in situations in which a write command with the same associated data is repeatedly received from host 10, said write command can remain relatively high on list T1 and/or T2, and consequently remain in a "dirty" state for an arbitrarily long time. Thus, in some embodiments, the above-described eviction scheme may be modified by periodically flushing each and every "dirty" write command currently present in list T1 and/or T2 to disk drive 110. In other embodiments, each cache entry in recency list T1 and/or each cache entry in frequency list T2 includes a time record of when that particular write command and associated data was first received from host 10. In such embodiments, a predetermined number of the oldest dirty cache entries may be periodically written to storage disk 110 before any other data are written to storage disk 110. Alternatively, whenever a cache entry has remained in the dirty state for more than a predetermined time period, said cache entry can be immediately written to storage disk 100. In such embodiments, the length of time that cache entries remain in the dirty state can be directly controlled.

Because it is impractical to fully consider every one of thousands of possible write commands in flash memory device 135 that can be executed, in one embodiment of the invention, a predetermined number N of the oldest "dirty" write commands in flash memory device 135 are reordered and then executed to storage disk 110. In such an embodiment, predetermined number N is selected to be a number of write commands that can be reordered in less time than the typical access time for disk drive 100, where N is generally a small fraction of the total number of dirty write commands presently stored in flash memory device 135. In some embodiments, N is one or more orders of magnitude smaller than the total number of dirty write commands stored in flash memory device 135, e.g., one tenth, one hundredth, one thousandth, etc. Because a manageable number of write commands stored in flash memory device 135 are reordered, the transfer rate of data to storage disk 110 is maximized for disk drive 100. In addition, because the commands being reordered and executed are the oldest dirty write commands in flash memory 135, the residence time of dirty write commands in flash memory device 135 is minimized. One such embodiment is described below in conjunction with FIG. 5.

Figure 5:
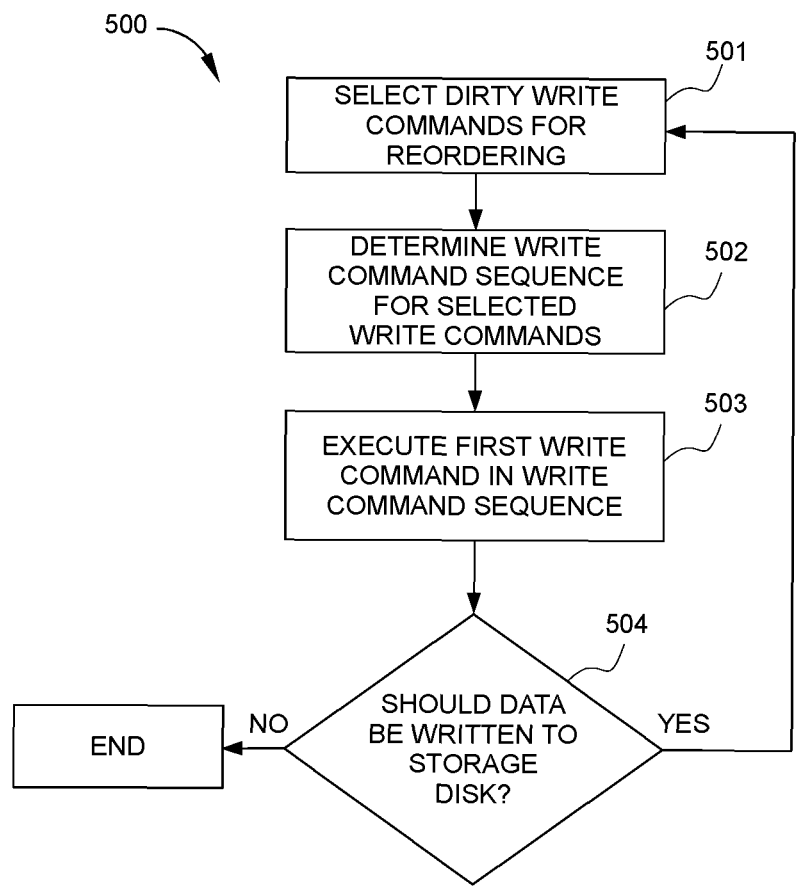
FIG. 5 sets forth a flowchart of method steps for executing write commands that are stored in cache memory in a disk drive, according to one embodiment of the present invention.

FIG. 5 sets forth a flowchart of method steps for executing write commands that are stored in cache memory in a disk drive, according to one embodiment of the present invention. Although the method steps are described in conjunction with disk drive 100 in FIG. 1, persons skilled in the art will understand that other disk drive systems configured to perform the method steps fall within the scope of the invention. Prior to method 500, predetermined number N is selected based on the processing speed of microprocessor-based controller 133 and the typical access time of a write command when executed by disk drive 100. For example, in some embodiments, N is on the order of 100 to 200. As micro-processor speeds increase with respect to access times, the value of N can also increase.

As shown, method 500 begins at step 501, when N dirty write commands stored in flash memory device 135 are selected for reordering. In some embodiments, the N write commands are selected entirely from the bottom of recency list T1, i.e., the oldest N dirty write commands are selected. In other embodiments, the N write commands selected are a combination of the oldest dirty write commands from recency list T1 and frequency list T2. In other embodiments, all N write commands are selected from either recency list T1 or from frequency list T2 in an alternating fashion. In such embodiments, method 500 is performed on write commands selected from only one of these lists, e.g., recency list T1, then the next time method 500 is performed, write commands are only selected from the other list, e.g. frequency list T2.

In step 501, selection of other combinations of write commands from recency list T1 and frequency list T2 in step 501 also falls within the scope of the invention. For example, in embodiments in which LRU lists T1, T2, B1, and B2 are lists of write command groups, rather than lists of individual write commands, all dirty write commands in the oldest write command group associated with LRU list T1 or T2 may be selected. In some embodiments, when the number of dirty write commands in the oldest write command group is substantially less than N, some or all of the dirty write commands associated with the next oldest write command group associated with LRU list T1 or T2 are selected so that the number of write commands selected is closer to or exactly equal to N. Because in such an embodiment write commands stored in flash memory device 135 are organized by write command group, such a selection process is computationally very economical and does not require randomly searching through the thousands of cache entries stored in flash memory device 135.

In step 502, a write command sequence using the N write commands selected in step 501 is determined that optimizes how quickly the N write commands can be executed to storage disk 110. The reordering is based on the access time of each of the N write commands selected in step 501. The access time for each write command is calculated based on a number of factors, including a starting location of read/write head 127, the write location specified by the write command, the rotational speed of storage disk 110, and the predicted seek time between the starting location and the write location.

In some embodiments, all N! combinations of write command order are calculated in step 502 to determine the best possible write command sequence for the N write commands selected in step 501. In such embodiments, the value of N is necessarily a relatively small number to enable all calculations to be performed in a timely fashion. In other embodiments, an optimal write sequence is determined using a less calculation-intensive scheme, in which the most quickly accessed write command of the N write commands selected in step 501 is chosen as the first in the write command sequence, the most quickly accessed write command of the remaining N−1 write commands is chosen as the second in the write command sequence, and so on. Such a scheme for determining a write command sequence in step 502 is significantly less computationally demanding than determining all N! possible sequences, thereby allowing N to be a significantly larger number. Any other write command reordering schemes may also be applied to the N write commands selected in step 502 and fall within the scope of the invention.

In step 503, the first write command of the write command sequence determined in step 502 is written to storage disk 110. It is noted that in some configurations of disk drive 100, some buffering of data to RAM 134 may be required when writing to storage disk 110 from flash memory device 135.

In step 504, one or more write commands are evicted from flash memory device 135. Specifically, the evicted write command is removed from cache directory 400, i.e., either recency list T1 or frequency list T2, which produces an open entry position. Newer entries on the list containing the evicted write command are all pushed toward the associated ghost list. For example, referring to cache directory 400 in FIG. 4, when cache entry D2 is evicted in step 504, cache entries D3, D4, and D5 are pushed toward cache entry D1, leaving entry position 451 open for more data to be received from the host computer.

In some embodiments, the write command evicted from flash memory device 135 in step 503 is the write command executed to storage disk 110 in step 503. Alternatively, in step 504 the oldest write command in cache directory 400 that has already been executed to storage disk 110 is evicted from flash memory device 135, rather than the write command executed to storage disk 110 in step 503. Other eviction schemes can also be used to make space available in flash memory device 135 without exceeding the scope of the invention.

In step 504, the determination is made whether or not any further data stored in flash memory device 135 should be written to storage disk 110. When the determination is made that data stored in flash memory device 135 should be written to storage disk 110, method 500 proceeds back to step 501. The determination made in step 504 may be based on the factors described above in step 303 of method 300, such as read/write head 127 being idle or storage capacity depletion of flash memory device 135.

It is noted that steps 501 and 502 are performed to determine a current write command while a previously selected write command stored in flash memory device 135 is being executed by disk drive 100 and then evicted, i.e., while steps 503 and 504 are being performed for the previously selected write command. Similarly, while steps 503 and 504 are being performed for the current write command, steps 501 and 502 are being performed to determine yet another write command to be executed to storage disk 110. In this way, dirty write commands in cache memory that are selected from the oldest data on flash memory device 135 are continuously executed. Because data from among the oldest data present in flash memory device 135 are continually selected to be written to storage disk 110 and then evicted, the average residence time of data on flash memory device 135 is minimized.

In some embodiments, a reordering algorithm and an eviction algorithm are performed independently in disk drive 100 to achieve the dual goals of improving the efficiency of writing data from flash memory device 135 to storage disk 110 and maximizing the eviction of the least-used data stored in flash memory device 135. Unlike method 500, a reordering algorithm is used to select write commands stored in flash memory device 135 that is not limited to reordering the N oldest dirty write commands in flash memory device 135. In addition, the selection process for evicting data from flash memory device 135 is not determined by the write command sequence. One such embodiment is described below in conjunction with FIG. 6.

Figure 6:
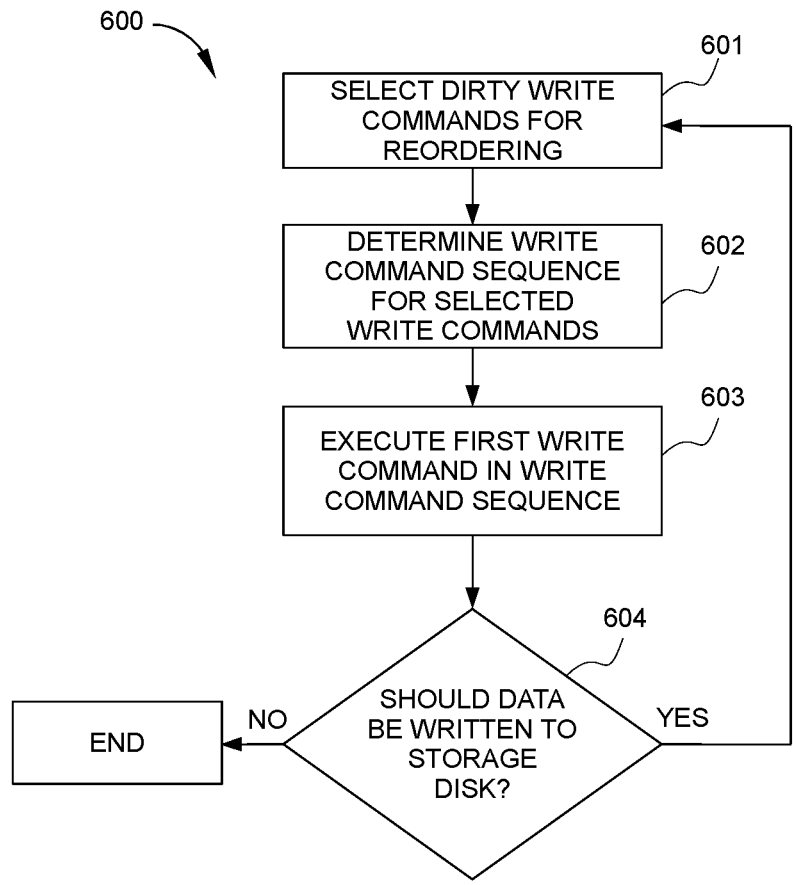
FIG. 6 sets forth a flowchart of method steps for executing write commands that are stored in cache memory in a disk drive, according to another embodiment of the present invention.

FIG. 6 sets forth a flowchart of method steps for executing write commands that are stored in cache memory in a disk drive, according to another embodiment of the present invention. Although the method steps are described in conjunction with disk drive 100 in FIG. 1, persons skilled in the art will understand that other disk drive systems configured to perform the method steps fall within the scope of the invention. Prior to method 600, predetermined number N may be selected in the same fashion described above in conjunction with method 500.

As shown, method 600 begins at step 601, when N dirty write commands stored in flash memory device 135 are selected for reordering. The N write commands are selected based on proximity of the target location of each write commands to the current location of read/write head 127. The proximity of dirty write commands to the current location of read/write head 127 can be readily determined by comparing the LBA of the write command currently being executed to the LBA of dirty write commands stored in flash memory device 135. Because the many write commands stored in flash memory device 135 can be organized by LBA in a tabular fashion, such a proximity determination can be performed very quickly and with little computational overhead; the thousands or hundreds of thousands of cache entries in flash memory device 135 are not randomly searched. In other embodiments, the proximity of dirty write commands to the current location of read/write head 127 can be determined by using cylinder-head-sector location information for dirty write commands stored in flash memory device 135. Cylinder-head-sector location information provides a more detailed physical location on storage disk 110 where data from each write command in flash memory device 135 will be written to, but accessing such information may require more computation time than an LBA-based approach.

In step 602, a write command sequence using the N write commands selected in step 501 is determined that optimizes how quickly the N write commands can be executed to storage disk 110. Any of the reordering schemes described above in step 502 of method 500 may be used to determine the write command sequence. Alternatively, any other technically feasible reordering scheme known in the art may be used to determine the write command sequence in step 602.

In step 603, the first write command of the write command sequence determined in step 602 is written to storage disk 110. As noted above in step 503 of method 500, some buffering of data to RAM 134 may take place when writing data to storage disk 110 from flash memory device 135.

In step 604, the determination is made whether or not any further data stored in flash memory device 135 should be written to storage disk 110. When the determination is made that data stored in flash memory device 135 should be written to storage disk 110, method 600 proceeds back to step 601. The determination made in step 604 may be based on the factors described above in step 303 of method 300, such as read/write head 127 being idle or storage capacity depletion of flash memory device 135.

Concurrently with steps 601-604, in which data are written to storage disk 110 from flash memory device 135, data are also evicted as required from flash memory device 135. The process by which write commands are selected for eviction from flash memory drive 135 is described below in steps 710-720.

Figure 7:
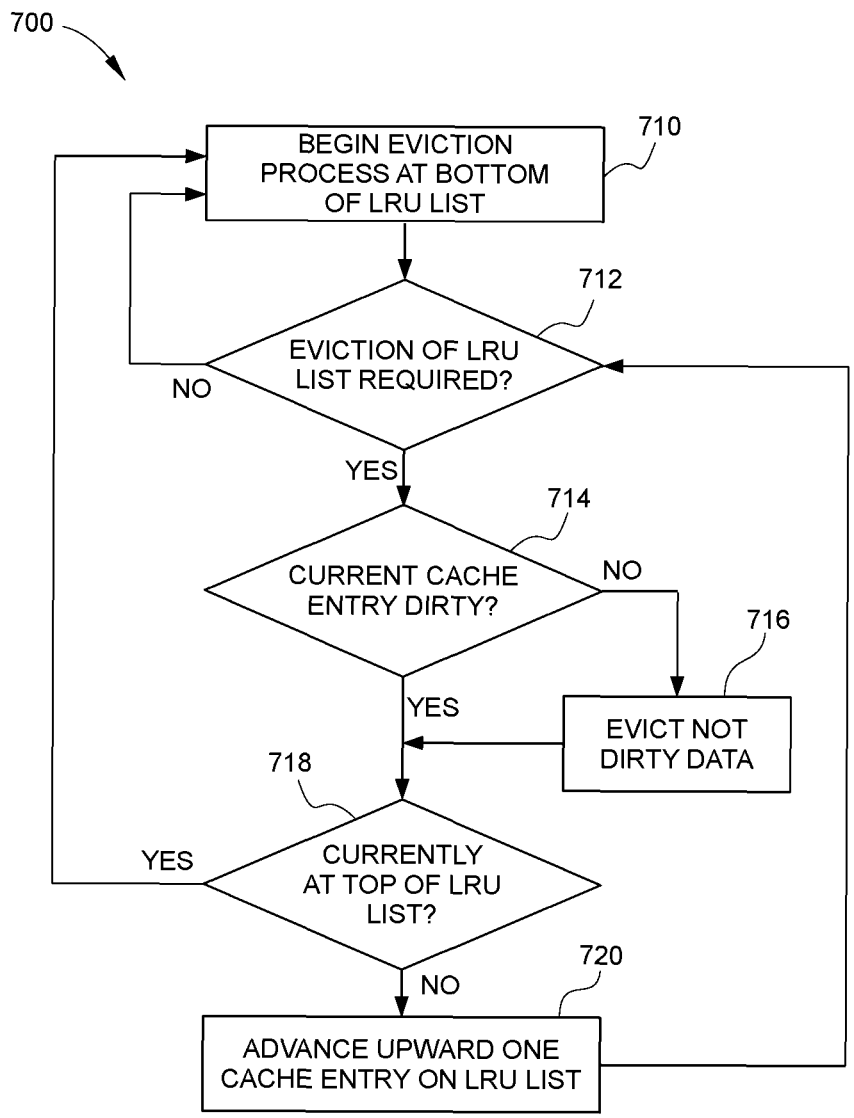
FIG. 7 sets forth a flowchart of method steps for an eviction algorithm for a disk drive, according to another embodiment of the present invention.

FIG. 7 sets forth a flowchart of method steps for an eviction algorithm for a disk drive, according to another embodiment of the present invention. As shown, the eviction algorithm 700 for evicting write commands from flash memory drive 135 begins in step 710, where method 700 is initialized to consider the eviction of the least-recently used (LRU) data in flash memory device 135. The LRU data in flash memory device 135 correspond to the cache entry at the bottom of either recency list T1 (cache entry D1), or frequency list T2 (cache entry D6) in FIG. 4. In some embodiments, the eviction algorithm in method 700 may alternate between beginning at the bottom of recency list T1 and at the bottom of frequency list T2.

In step 712, the determination is made whether or not data should be evicted from flash memory device 135. In some embodiments, data and associated cache entries in cache directory 400 are evicted when flash memory device 135 is substantially full of stored data and has little or no remaining storage capacity. In other embodiments, cache entries and associated data are required to be evicted only until a desired fraction of flash memory drive 135 is available for receiving additional data from the host computer. In yet other embodiments, data are required to be evicted until all data less than a desired age remains in flash memory drive 135. Other criteria may also be used to determine in step 712 if data are to be evicted from flash memory device 135 without exceeding the scope of the invention. If it is determined that data should be evicted from flash memory device 135, the eviction algorithm proceeds to step 714. If not, the eviction algorithm proceeds to step 710.

In step 714, the validity of data associated with the cache entry currently under consideration is checked. Data are considered "not dirty" when the data have been written to storage disk 110. If the data are not dirty, the eviction algorithm proceeds to step 716 as shown in FIG. 7. If the data are dirty, the eviction algorithm proceeds to step 718. It is noted that initially the cache entry under consideration in step 714 is the least-recently used (LRU) data selected in step 710. In later iterations, the cache entry under consideration by the eviction algorithm is generally a cache entry located higher up recency list T1 or frequency list T2, as described below in step 720.

In step 716, data determined to be not dirty in step 714 are evicted from flash memory device 135, and the available storage capacity of flash memory device 135 is increased.

In step 718, the eviction algorithm checks if the cache entry currently under consideration is at the top of the LRU list. If yes, the eviction algorithm proceeds to step 710. If the cache entry currently under consideration is not at the top of the LRU list, the eviction algorithm proceeds to step 720.

In step 720, the eviction algorithm considers the next cache entry on recency list T1 or frequency list T2. In some embodiments, only cache entries in recency list T1 are eligible for consideration, and the eviction algorithm advances one cache entry upward, i.e., to the next youngest cache entry, on recency list T1. In other embodiments, the eviction algorithm considers a combination of the cache entries in recency list T1 and frequency list T2, and increments up one cache entry on such a combined list in step 720. As shown in FIG. 7, method 700 proceeds to step 712 after incrementing to the next cache entry on the list of eligible cache entries used in step 720. Thus, over time, the eviction algorithm proceeds stepwise from the bottom to the top of the desired LRU list, evicting not dirty cache entries along the way. The eviction algorithm then returns to the bottom of the desired LRU list after reaching the top (i.e., newest) entry on said list.

Due to the very large number of write commands that can be stored in flash memory device 135, the time required for the eviction algorithm of method 700 to evict all eligible write commands from flash memory device 135 can be substantial. This is particularly true when a large number of additional write commands are being continuously stored in flash memory device 135. In such situations, the eviction algorithm of method 700 cannot consider the validity of and subsequently evict cache entries located at the bottom of recency list T1 and/or frequency list T2 for undesirably long periods. In addition, due to the nature of reordering algorithms known in the art, a large number of write commands assigned to specific regions of storage disk 110 can prevent the storage of certain write commands on disk 110 for an undesirable period of time. Specifically, write commands stored in flash memory device 135 that are to be written to regions remote from the current position of the read/write head may remain "dirty" for a very long time. Consequently, in some embodiments of the invention, an eviction algorithm is periodically reset to execute the least-recently-used write commands stored in flash memory device 135. One such embodiment is described below in conjunction with FIG. 8.

Figure 8:
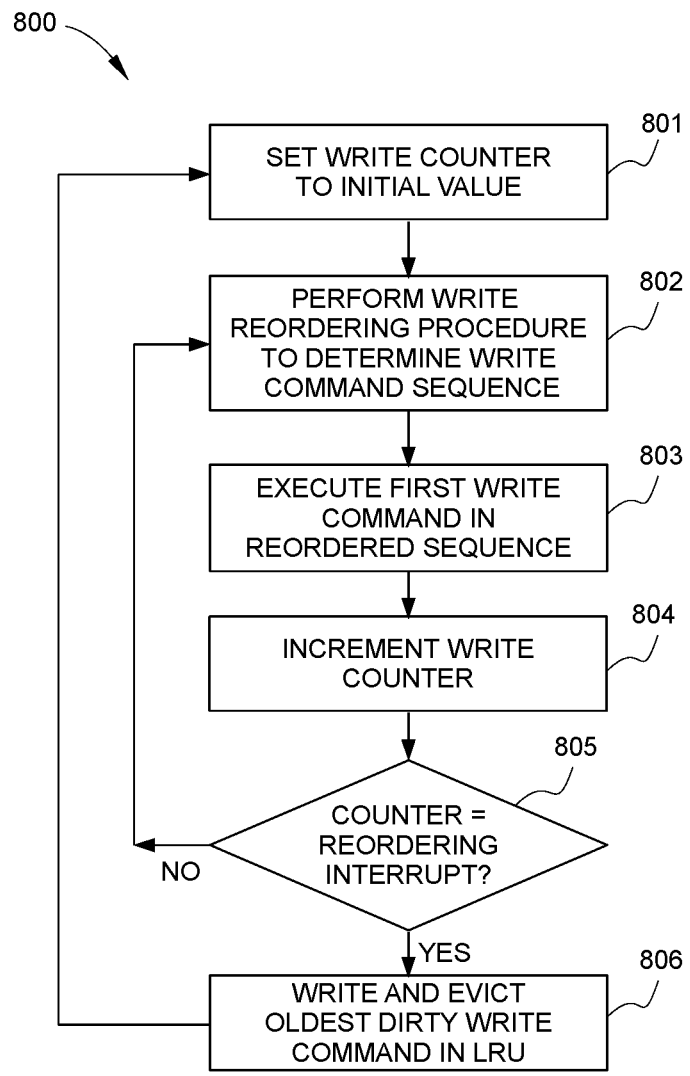
FIG. 8 sets forth a flowchart of method steps for executing write commands that are stored in cache memory in a disk drive, according to another embodiment of the present invention.

FIG. 8 sets forth a flowchart of method steps for executing write commands that are stored in cache memory in a disk drive, according to another embodiment of the present invention. Although the method steps are described in conjunction with disk drive 100 in FIG. 1, persons skilled in the art will understand that other disk drive systems configured to perform the method steps falls within the scope of the invention. Prior to method 800, a reordering interrupt value M is selected, where M is a relatively large integer, e.g., on the order of 1000. Reordering interrupt value M dictates how often a write-reordering procedure used by disk drive 100 is interrupted and "reset" by forcing disk drive 100 to execute the least-recently-used write command in an LRU list associated with flash memory device 135, i.e., write the least-recently-used dirty data in the LRU list to storage disk 110.

As shown, method 800 begins at step 801, where a write counter value is set to a suitable initial value, e.g., 1 or 0.

In step 802, disk drive 100 performs a write-reordering procedure to determine a write command sequence that optimizes how quickly write commands stored in flash memory device 135 are executed to storage disk 110. The write-reordering procedure may include any write-reordering algorithm known in the art. In another embodiment, one of the write-re-ordering algorithms described above in step 501 and 502 of method 500 may be used in step 802. In yet another embodiment, the servo-subzone-based write-reordering algorithm described below in conjunction with FIGS. 9 and 10 may be used in step 802.

In step 803, the first write command of the write command sequence determined in step 802 is executed and the data associated therewith is written to storage disk 110.

In step 804, the write counter value is incremented higher by a value of 1.

In step 805, the value of the write counter incremented in step 804 is compared to reordering interrupt value M. If the write counter is less than the value of reordering interrupt value M, method 800 proceeds to step 802, and another write command sequence is determined. If the write counter equals the value of reordering interrupt value M, method 800 proceeds to step 806.

In step 806, the current write-reordering algorithm is interrupted. Rather than selecting a write command determined by an optimized write command sequence, the least-recently-used dirty write command stored in flash memory device 135 is executed to storage disk 110. Specifically, the dirty write command located nearest the bottom of an LRU list associated with flash memory device 135 is executed. In some embodiments, the LRU list used in step 806 may be recency list T1, frequency list T2, or an LRU list that includes the combined cache entries of recency list T1 and frequency list T2. Once the dirty write command from the LRU list is executed to storage disk 110, the method proceeds back to step 801, where the write counter value is set to 1.

Thus, in method 800, the least-recently-used data on flash memory device 135 are written periodically to disk, so that the residence time of dirty write-commands on flash memory device 135 is minimized for two reasons. First, the least-recently-used write command on flash memory device 135 is automatically executed to storage disk 110 after every M write commands. Second, because the location of the current write command being executed strongly influences what write command will next be selected, when the location of read/write head 127 is "reset" to the location of the least-recently-used dirty write command on flash memory device 135, the write-reordering algorithm will continue to select write commands proximate that reset location. In this way, the write-reordering algorithm can "clean up" the write commands located near the reset location, which are likely relatively old data as well, i.e., data received from host 10 before most other dirty data currently stored in flash memory device 135. Furthermore, because the write-reordering algorithm is only interrupted at relatively large intervals, the efficiency of the write-reordering algorithm itself is only slightly impacted.

According to some embodiments of the invention, a write-reordering algorithm is contemplated in which the write commands being reordered are selected from the same servo sub-zone in which read/write head 127 is currently located. In this way, a manageable number of write commands can be quickly selected from the thousands or hundreds of thousands of write commands stored in flash memory device 135. Advantageously, the write commands selected in this manner are guaranteed to be located proximate each other and read/write head 127. Because of this proximity, the access time between the selected write commands and, consequently, the time required to execute most or all of the selected write commands, is minimized.

Figure 9:
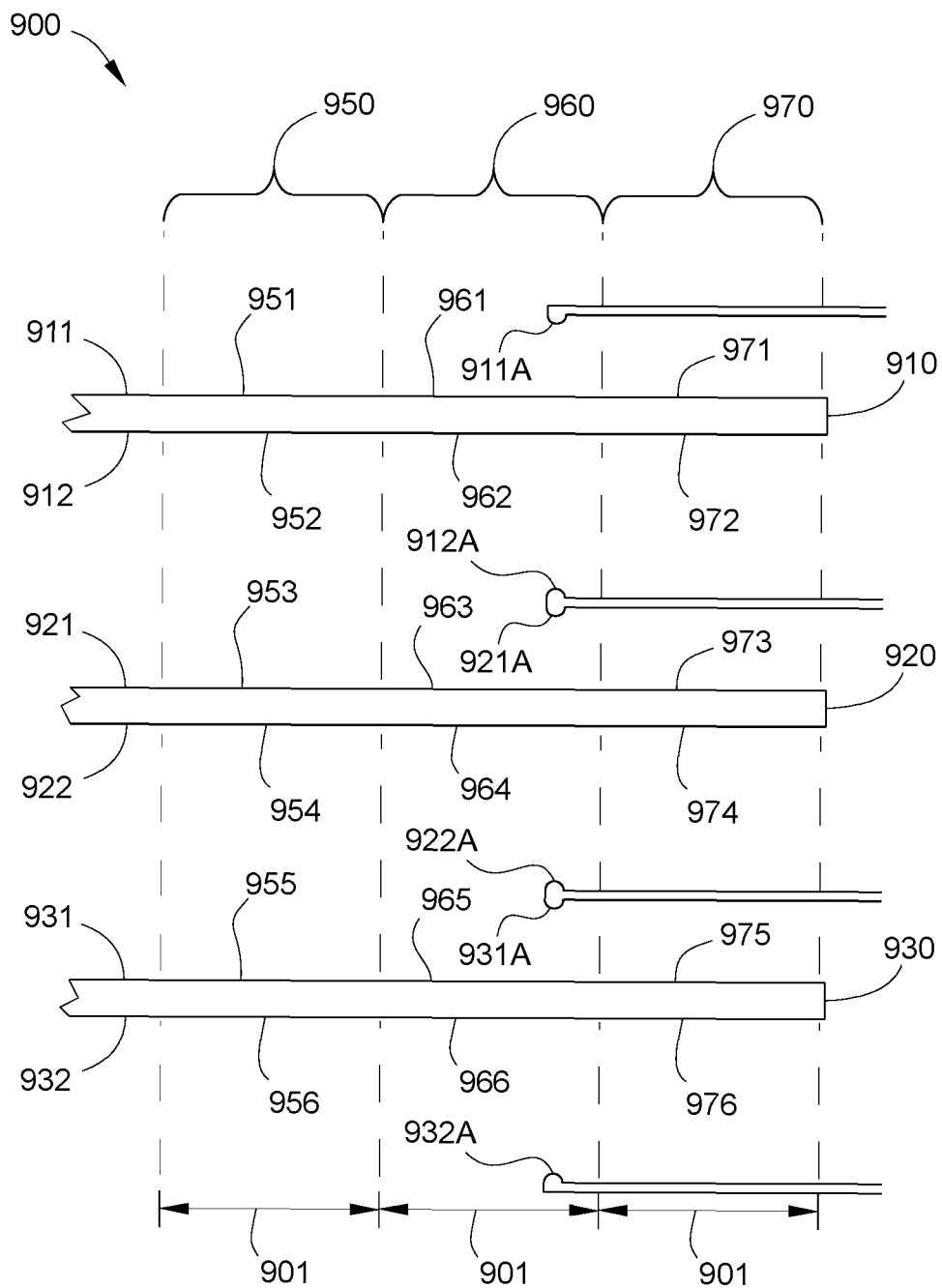
FIG. 9 schematically illustrates a partial side-view of a disk drive configured with multiple storage disks, and multiple read/write heads.

FIG. 9 schematically illustrates a partial side-view of a disk drive 900 configured with multiple storage disks 910, 920, and 930, and multiple read/write heads. Each read/write head of disk drive 900 is associated with one surface of one of storage disks 910, 920, and 930. Specifically, read/write heads 911A, 912A, 921A, 922A, 931A, 932A are associated with disk surfaces 911, 912, 921, 922, 931, and 932, respectively. Disk drive 900 is otherwise substantially similar in organization and operation to disk drive 100.

Storage disks 910, 920, and 930 are organized into data zones, where each data zone includes a group of tracks configured with the same number of data sectors. Each data zone is in turn subdivided into a plurality of servo subzones, each servo subzone being made up of approximately 100 to 200 data tracks. The portion of storage disks 910, 920, 930 illustrated in FIG. 9 includes servo subzones 950, 960, and 970. As shown, servo subzones 951-953 each include a portion of disk surfaces 911, 912, 921, 922, 931, and 932 that has a width 901 of approximately 100-200 tracks. Each such portion of a disk surface associated with a single read/write head is herein referred to as a "subzone segment." Thus, servo subzone 950 includes subzone segments 951-956, servo subzone 960 includes subzone segments 961-966, and servo subzone 970 includes subzone segments 971-976.

Figure 10:
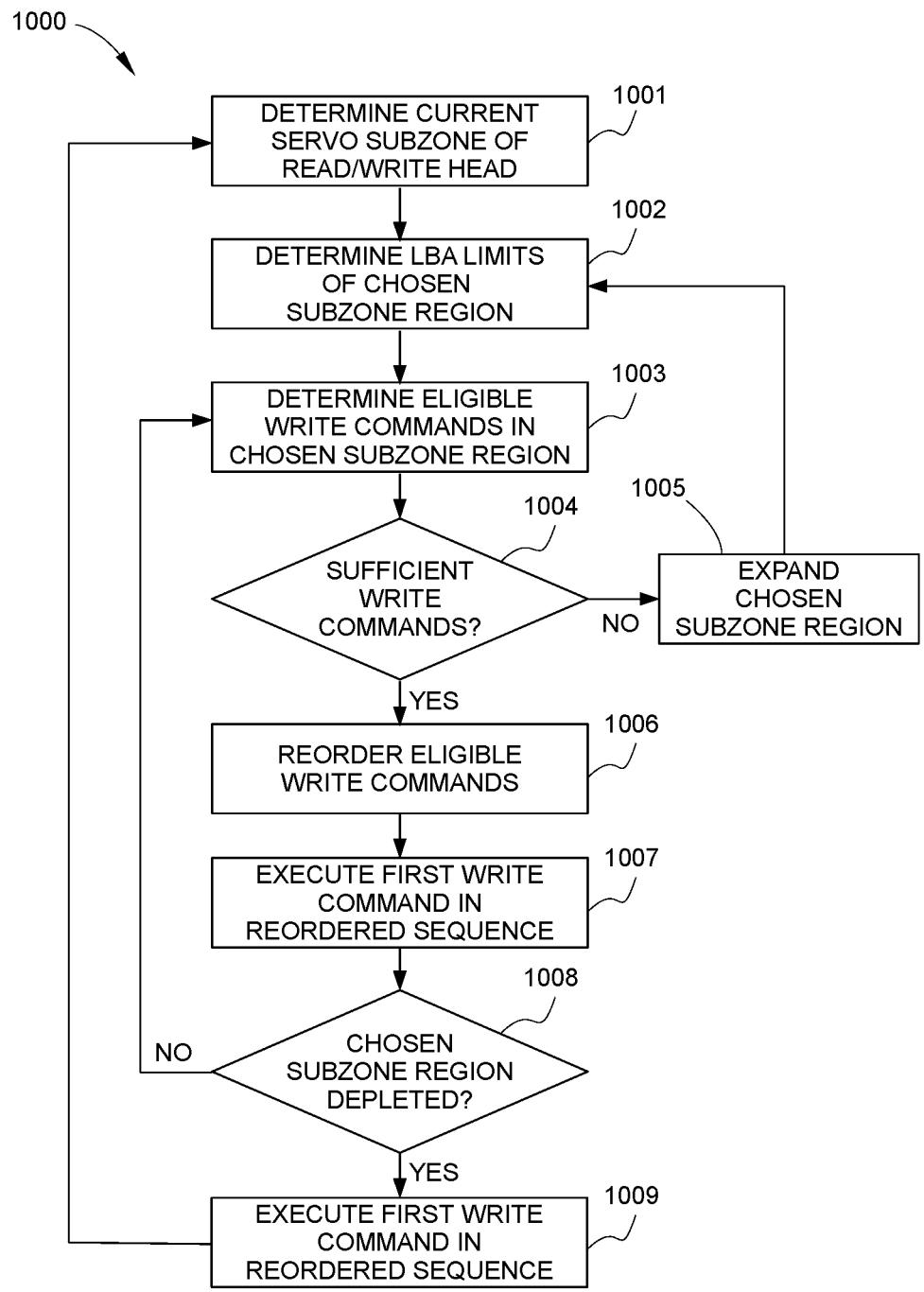
FIG. 10 sets forth a flowchart of method steps for executing write commands that are stored in cache memory in a disk drive, according to another embodiment of the present invention.

FIG. 10 sets forth a flowchart of method steps for executing write commands that are stored in cache memory in a disk drive, according to another embodiment of the present invention. Although the method steps are described in conjunction with disk drive 900 in FIG. 9, persons skilled in the art will understand that other disk drive systems configured to perform the method steps fall within the scope of the invention. Prior to method 1000, a write-command minimum K is selected based on the processing speed of microprocessor-based controller 133 and the typical access time of a write command when executed by disk drive 900. The value of write-command minimum K is chosen so that an adequate number of write commands are used in write-reordering calculations so that efficient write-command sequences are generated; a write-reordering algorithm using too few write commands generally provides less time-efficient write-command sequences. However, because the write commands being reordered in method 1000 are already selected to be located proximate each other, the value of write-command minimum K may be substantially smaller than values preferably used for predetermined number N in methods 500 and 600. For example, in some embodiments, K is on the order of 10 to 50.

As shown, method 1000 begins at step 1001, where the current subzone segment of the active read/write head of disk drive 900 is determined. For example, read/write head 921A in FIG. 9 may be in the process of executing a write command stored in flash memory device 135 to one or more data tracks in subzone segment 963. Thus, in this example, the current subzone segment is subzone segment 963.

In step 1002, the LBA limits of the chosen subzone region is determined. Initially, the chosen subzone region is synonymous with the current subzone segment determined in step 1001. Thus, considering the example of read/write head 921A executing a write command in subsector segment 963 during step 1001, in step 1002 the LBA limits of the data tracks contained in subsector segment 963 are determined. In some situations, which are described below in step 1005, the chosen subzone region also includes one or more subzone segments adjacent or proximate to the current subzone segment determined in step 1001. Determination of the LBA limits of the chosen subzone region may involve consulting a look-up table, but typically an algorithm is used to determine such LBA limits based on track density, the LBA limits of the data zone containing the subsector segment or segments of interest, and the like.

In step 1003, all write commands that are eligible for writing to a servo subzone in disk drive 900 are determined. Eligible write commands include all dirty write commands that are stored in flash memory device 135 and which have an LBA within the LBA limits (determined in step 1002) of the chosen subzone region. The determination of eligible write commands is a computationally efficient procedure since write commands stored in flash memory device 135 are generally tabulated and organized by LBA. Consequently, determining eligible write commands does not require searching through all cache entries in flash memory device 135, which can number in the hundreds of thousands.

In step 1004, the total number of eligible write commands determined in step 1003 is compared to the value of write-command minimum K. If the number of eligible write commands is greater than or equal to the value of write-command minimum K, method 1000 proceeds to step 1006. If the number of eligible write commands is less than the value of write-command minimum K, method 1000 proceeds to step 1005 and then back to step 1002.

In step 1005, the chosen subzone region is expanded to include one or more proximate and/or adjacent subzone segments, then method 1000 returns to step 1002. For example, when the chosen subzone region in step 1003 consists of subzone segment 963, and in step 1004 the number of eligible write commands is less than the value of write-command minimum K, the chosen subzone region may be expanded to include subzone segment 953 and/or subzone segment 973. When the chosen subzone region in step 1003 already consists of several subzone segments, e.g., subzone segments 953, 963, and 973, the chosen subzone region may be expanded to include one or more additional subzone segments (not shown) on surface 921 of storage disk 920. Because each of the subzone segments on surface 921 is made up of a relatively small number of tracks, e.g., typically 200 tracks or less, radial seek time between these subzone segments is very short. Consequently, write commands distributed across multiple subzone segments on disk surface 921 can be executed with relatively low latency between the write commands, which improves the effective data transfer rate from flash memory device 135 to storage disk 920.

In some embodiments, when the chosen subzone region in step 1003 already consists of a relatively large number of subzone segments on one disk surface, e.g., surface 921, the chosen subzone region may be expanded in step 1005 to include one or more subzone segments on a neighboring disk surface, e.g., disk surface 912 or 922. In such embodiments, the subzone segments on neighboring surfaces are included when the radial seek time across the chosen subzone region exceeds an estimated head switch time for disk drive 900. For example, when the chosen subzone region in step 1003 consists of 10 or 12 subzone segments, the radial seek time between subzone segments disposed on opposite ends of the chosen subzone region can potentially exceed the head switch time between different read/write heads of disk drive 900. Thus, when expanding the chosen subzone region in step 1005, subzone segments on different disk surfaces can effectively be closer and have less associated latency than subzone segments on the same disk surface and adjacent to the currently defined chosen subzone region. For this reason, in some embodiments, expansion of the chosen subzone region in step 1005 is not limited to subzone segments located on the same disk surface, and may include subzone segments located on other disk surfaces of disk drive 900 as well.

In step 1006, write reordering of the eligible write commands determined in steps 1003-1005 is performed. In one embodiment, the write reordering of step 1006 uses position optimization of each write command. Specifically, access time for each eligible write command is based on radial seek and rotational latency, so that optimal seek times are determined for each write command. This is in contrast to an LBA-based write-reordering scheme, which is essentially a track-based calculation that does not include rotational latency.

In step 1007, the first write command of the write command sequence determined in step 1006, i.e., the write command having the shortest access time, is executed and data associated with said write command is written to storage disk 110.

In step 1008, the chosen subzone region is checked for depletion of write commands. In other words, the number of dirty write commands remaining in flash memory device 135 having LBAs located in the chosen subzone region is determined. If this number is equal to or less than a predetermined limit, then the chosen subzone region is considered depleted of write commands and method 1000 proceeds to step 1009. If this number exceeds the predetermined limit, then the chosen subzone region is not considered depleted of write commands and method 1000 proceeds to step 1003 and write-reordering is performed again. In some embodiments, the predetermined limit is a number at which write reordering becomes relatively inefficient, e.g., 10 or 20. In other embodiments, the predetermined limit is 0, i.e., the chosen subzone region is not considered depleted of write commands until there are no remaining write commands stored in flash memory device 135 having LBAs located in the chosen subzone region.

In step 1009, after the chosen subzone region has been determined in step 1008 to be depleted of write commands, read/write head 127 is moved to a different subzone. In one embodiment, read/write head 127 is moved to a subzone that is adjacent to the chosen subzone region. Thus, read/write head 127 can be moved progressively across a surface of storage disk 110 from one subzone to another subzone when executing a large number of write commands stored in flash memory device 135. In this way, read/write head 127 is guaranteed to pass over all subzones of storage disk 110, which prevents write commands residing in flash memory device 135 from remaining dirty for an undesirably long time. In addition, the process of executing write commands stored in flash memory 135 is very time efficient. Because read/write head 127 only traverses from one chosen subzone region to an adjacent subzone, read/write head 127 is not executing write data to random locations across storage disk 110 or multiple storage disks 110. Consequently, very little time is spent repositioning read/write head 127 from one subzone to another subzone upon completion of method 1000.

In some embodiments, a "reset" procedure is periodically performed in which read/write head 127 is moved to the subzone in which the location corresponding to the least-recently-used write command in flash memory 135 is disposed. In such an embodiment, method 1000 is then performed on a chosen subzone region that includes this subzone, i.e., write-reordering and writing is performed on the write commands stored in flash memory device 135 having LBAs corresponding to this subzone. Thus, the least-recently-used write command in flash memory device 135, as well as write commands having LBAs corresponding to same subzone as the least-recently-used write command, are then executed and the data associated therewith is written to storage disk 110. In this way, the least-recently-used write commands stored in flash memory device 135 are executed periodically, which prevents write commands residing in flash memory device 135 from remaining dirty for an undesirably long time.

In some embodiments such a reset procedure is performed after a predetermined number of write commands stored in flash memory device 135 have been executed. It is desirable for the predetermined number to be relatively large to minimize the introduction of inefficiency into performance of method 1000, e.g. once every 1000 write commands. Alternatively, such a reset procedure is performed after a predetermined number of iterations of method 100 has been performed, e.g. 50 to 100.

In sum, embodiments of the invention provide systems and methods for increasing the rate at which data are transferred to a non-volatile medium in an HDD. By using a large nonvolatile solid state memory device as cache memory for a magnetic disk drive, a very large number of write commands can be cached and subsequently reordered and executed in an advantageously efficient manner. An additional advantage of the present invention is that by strategically selecting and reordering only a portion of the write commands stored in the nonvolatile solid state memory device, efficiency of the reordering process is further increased.

While the foregoing is directed to embodiments of the present invention, other and further embodiments of the invention may be devised without departing from the basic scope thereof, and the scope thereof is determined by the claims that follow.

We claim:

1. A data storage device comprising:
a nonvolatile solid state memory device;
a magnetic storage disk; and
a control unit configured to order data blocks to be written to the magnetic storage disk by:
writing the data blocks to the nonvolatile solid state memory device;
selecting N data blocks out of M data blocks stored in the nonvolatile solid state memory device to create a first ordering of data blocks, where N is less than M;
reordering the selected data blocks to create a second ordering having a first data block different than the first data block of the first ordering prior to writing the selected data blocks to the magnetic storage disk; and
writing the first data block of the second ordered data blocks to the magnetic storage disk,
wherein selecting N data blocks comprises selecting the N least-recently-used data blocks from a least-recently-used list of data blocks that are stored in the nonvolatile solid state memory device and have not been written to the magnetic storage disk.

2. The data storage device of claim 1, wherein the least-recently used list of data blocks comprises a recency list of data blocks written to the nonvolatile solid state memory device, a frequency list of data blocks written to the nonvolatile solid state memory device, or a combination of both.

3. The data storage device of claim 2, wherein at least one of the recency list and the frequency list comprises a linked list of data blocks in which a data structure is associated with each data block included in the linked list and includes a pointer referencing the next less-recently-used data block in the linked list and a pointer referencing the next more-recently-used data block in the linked list.

4. The data storage device of claim 2, wherein at least one of the recency list and the frequency list comprises a linked list of data block groups in which a data structure is associated with each data block group included in the linked list and includes a pointer referencing a next less-recently-used data block group in the linked list and a pointer referencing a next more-recently-used data block group in the linked list.

5. The data storage device of claim 4, wherein a data block group in the linked list consists of a plurality of data blocks in which a least-recently-used data block of the plurality of data blocks has been used more recently than any data block in the next less-recently-used data block group and a most-recently-used data block of the plurality of data blocks has been used less recently than any data block in the next more-recently-used data block group.

6. The data storage device of claim 1, wherein the control unit is configured to order data blocks to be written to the magnetic storage disk by further performing the steps of:

selecting a second group of N data blocks out of the M data blocks stored in the nonvolatile solid state memory device to create a first ordering of the second group of N data blocks;

reordering the selected second group of N data blocks to create a second ordering of the second group of N data blocks having a first data block different than the first data block of the first ordering of the second group of N data blocks, prior to writing the selected data blocks to the magnetic storage disk; and writing the first data block of the second ordering of the second group of N data blocks to the magnetic storage disk.

7. The data storage device of claim 1, wherein the control unit is configured to order data blocks to be written to the magnetic storage disk by further performing the step of: writing the second data block of the second ordered data blocks to the magnetic storage disk.

8. The data storage device of claim 1, wherein N is substantially less than M or at least an order of magnitude less than M.

9. The data storage device of claim 1, wherein the control unit is configured to order data blocks to be written to the magnetic storage disk by further performing the step of: periodically writing the least-recently-used data block from the least-recently-used list of data blocks.

10. The data storage device of claim 1, wherein reordering the selected data blocks further comprises: calculating an access time for each write command associated with a portion of the selected data blocks, wherein the reordering of the selected data blocks is based on the calculated access times.

11. A data storage device comprising:
a nonvolatile solid state memory device;
a magnetic storage disk; and a control unit configured to order data blocks to be written to the magnetic storage disk by:
writing the data blocks to the nonvolatile solid state memory device;
selecting N data blocks out of M data blocks stored in the nonvolatile solid state memory device to create a first ordering of data blocks, where N is less than M;
reordering the selected data blocks to create a second ordering having a first data block different than the first data block of the first ordering prior to writing the selected data blocks to the magnetic storage disk;
writing the first data block of the second ordered data blocks to the magnetic storage disk; and
periodically writing the least-recently-used data block stored in the nonvolatile solid state memory device from a least-recently-used list of data blocks that are stored in the nonvolatile solid state memory device and have not been written to the magnetic storage disk,
wherein selecting N data blocks comprises selecting N data blocks whose logical block addresses are closest to the logical block address of the write command currently being executed.

12. The data storage device of claim 11, wherein the least-recently used list of data blocks comprises a recency list of data blocks written to the nonvolatile solid state memory device, a frequency list of data blocks written to the nonvolatile solid state memory device, or a combination of both.

13. The data storage device of claim 11, wherein the control unit is configured to order data blocks to be written to the magnetic storage disk by further performing the steps of:

selecting a second group of N data blocks out of the M data blocks stored in the nonvolatile solid state memory device to create a first ordering of the second group of N data blocks;

reordering the selected second group of N data blocks to create a second ordering of the second group of N data blocks having a first data block different than the first data block of the first ordering of the second group of N data blocks prior to writing the selected data blocks to the magnetic storage disk; and writing the first data block of the second ordering of the second group of N data blocks to the magnetic storage disk.

14. The data storage device of claim 11, wherein the control unit is configured to order data blocks to be written to the magnetic storage disk by further performing the step of: writing the second data block of the second ordered data blocks to the magnetic storage disk.

15. The data storage device of claim 11, wherein N is substantially less than M or at least an order of magnitude less than M.

16. The data storage device of claim 11, wherein reordering the selected data blocks further comprises: calculating an access time for each write command associated with a portion of the selected data blocks, wherein the reordering of the selected data blocks is based on the calculated access times.

17. A data storage device comprising:
a nonvolatile solid state memory device;
a magnetic storage disk; and a control unit configured to order data blocks to be written to the magnetic storage disk by:
writing the data blocks to the nonvolatile solid state memory device;
selecting data blocks stored in the nonvolatile solid state memory device whose logical block addresses correspond to locations disposed in a subzone region of the magnetic storage disk in which an active read-write head of the magnetic storage disk is located to create a first ordering of data blocks;
reordering the selected data blocks to create a second ordering having a first data block different than the first data block of the first ordering prior to writing the selected data blocks to the magnetic storage disk; and
writing the first data block of the second ordered data blocks to the magnetic storage disk.

18. The data storage device of claim 17, wherein the subzone region consists of a single servo subzone of the magnetic storage disk and the servo subzone comprises a portion of a data zone of the magnetic storage disk.

19. The data storage device of claim 17, wherein selecting data blocks stored in the nonvolatile solid state memory device further comprises: comparing the number of selected data blocks disposed in the subzone region to a predetermined minimum value; and in response to the comparing, redefining the subzone region to include an additional servo subzone, wherein the additional servo subzone is adjacent to the subzone region.

20. The data storage device of claim 19, wherein the predetermined minimum value is substantially less than the number of data blocks stored in the nonvolatile solid state memory device or at least an order of magnitude less than the number of data blocks stored in the nonvolatile solid state memory device.

21. The data storage device of claim 17, wherein the control unit is configured to order data blocks to be written to the magnetic storage disk by further performing the step of: periodically writing the least-recently-used data block stored in the nonvolatile solid state memory device from a least-recently-used list of data blocks that are stored in the nonvolatile solid state memory device and have not been written to the magnetic storage disk.

22. The data storage device of claim 21, wherein the least-recently used list of data blocks comprises a recency list of data blocks written to the nonvolatile solid state memory device, a frequency list of data blocks written to the nonvolatile solid state memory device, or a combination of both.

23. The data storage device of claim 17, wherein the control unit is configured to order data blocks to be written to the magnetic storage disk by further performing the step of: writing the second data block of the second ordered data blocks to the magnetic storage disk.

24. The data storage device of claim 23, wherein the control unit is configured to order data blocks to be written to the magnetic storage disk by further performing the step of: writing remainder data blocks of the second ordered data blocks to the magnetic storage disk until the number of remainder ordered data blocks is depleted.

25. The data storage device of claim 24, wherein the remainder ordered data blocks are depleted when the number of ordered data blocks that have not been written to the magnetic storage disk is less than a predetermined number ordered data blocks.

26. The data storage device of claim 25, wherein the predetermined number of ordered data blocks is 1.

27. The data storage device of claim 17, wherein reordering the selected data blocks further comprises: calculating an access time for each write command associated with a portion of the selected data blocks, wherein the reordering of the selected data blocks is based on the calculated access times.

* * * * *